March 4, 1947. J. S. KUSLICH 2,416,834
ARTIFICIAL FISH BAIT OR LURE
Filed May 23, 1944

INVENTOR.
John S. Kuslich
BY
ATTORNEYS.

Patented Mar. 4, 1947

2,416,834

UNITED STATES PATENT OFFICE 2,416,834

ARTIFICIAL FISH BAIT OR LURE

John S. Kuslich, St. Paul, Minn.

Application May 23, 1944, Serial No. 536,989

9 Claims. (Cl. 43—46)

1

This invention relates to artificial fish bait or lures.

The principal object of the invention is to provide a lure in which there is oscillation of a portion of the lure so as to bring into prominence, at intervals, a color or colors contrasting with the major color or colors of the lure.

Another important object is to provide a lure, having pivoted sections which cause a somewhat scissor-like motion of the lure when moving through the water.

Still another object is to provide a lure having pivoted sections, but which sections are not apt to become disjoined when the fish is hooked or when extracting the lure.

Another object is to provide a lure having pivoted sections, wherein the pivot pin has a dual function.

Other objects and advantages of the invention will be apparent during the course of the following detailed description of the invention, taken in connection with the accompanying drawing, and in which drawing.

Figure 1:
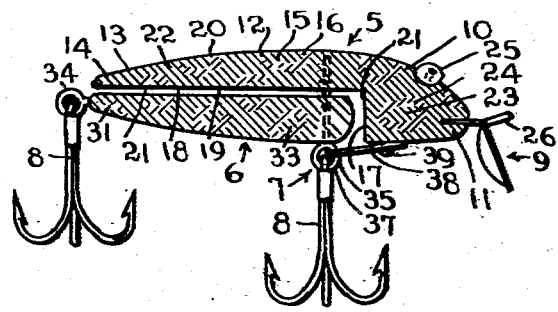
Figure 1 is a side elevation of the novel sectional lure.
Figure 2:
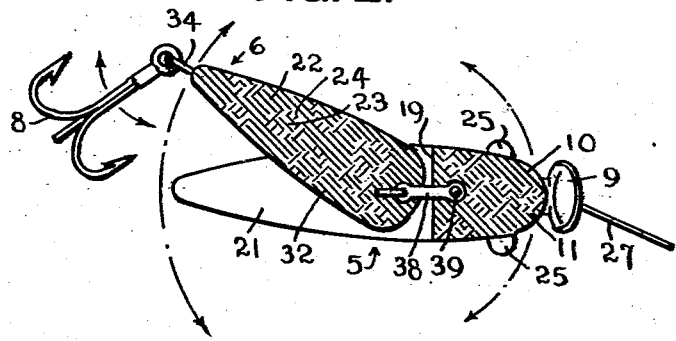
Figure 2 is a bottom plan of the same, in action.
Figure 3:
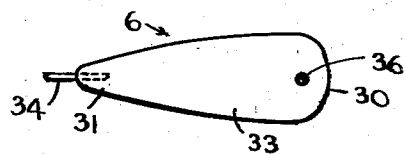
Figure 3 is a top plan of one section of the lure.

In the drawing, wherein for the purpose of illustration is shown a preferred embodiment of the invention and wherein similar reference characters designate corresponding parts throughout the several views, the novel artificial fish bait or lure includes a first, main or major body section 5 and a second or minor body section 6, means 7 pivotally connecting the sections 5 and 6 together so that they will move in water with a scissorlike motion, and a suitable number of hooks 8 attached to the sections 5 and 6. Preferably, there is also included an action plate 9.

The first or main body section 5 is, preferably, of one piece and includes a forwardly curved portion 10 providing the head 11 of the bait and a rearward portion 12, sloping from the head 11 and providing a portion 13 of the tail 14 and portion 15 of the body 16.

This main body section 5 is stepped, as shown in Fig. 1, by a substantially vertical cut 17, preferably just back of the head 11 extending transversely of the section 5 and a substantially horizontal cut 18 extending from the upper end of the cut 17 to the rear end of the section 5, thus providing a recess or step 19, opening downwardly and rearwardly. Consequently, there is a major outer surface 20 to the section 5, defined by the head 11 and upper surfaces of the body 16 and tail 14, while there is a minor outer surface 21 defined by the downwardly facing surface, provided by the cut 18, and a rearwardly facing surface, provided by the cut 17, within the recess or step 19.

2

The major outer surface 20 may be colored in any approved way with one or several colors. For example, it may be a green background 22 with green patches 23 defined by lines 24 of a contrasting color.

However, the minor outer surfaces 21 are preferably of one color, contrasting with the colors of the major outer surface 20. For example, the outer surfaces 21 may be white.

The main or major body section 5 may be provided with suitable simulated eyes 25 and the action plate 9, suitably placed, as is well known in the art. This action plate includes an eye 26 for the fishline 27. It will be noted in Fig. 1 that this eye 26 and, in fact, all of the action plate 9, is below the horizontal plane of the horizontal cut 18, and this disposition of the parts named contribute toward the proper scissorlike motion obtained.

As for the minor body section 6, this may be said to complete the body and tail portions of the novel bait, and fits into the recess 19, as shown in Fig. 1. Its forward end 30 is, preferably, rounded, and its rearward or tail end 31 carries one of the hooks 8. The major outer surface, that is the lowermost surface 32, of the section 6 may be colored the same as the major outer surface 20 of the section 5 and its uppermost surface 33 colored in a contrasting color, such as the color of the surface of the recess 19.

It will be noted that the rearward or tail end 31 projects slightly beyond the tail end of the section 5 so that the hook 8 or the eye 34 attaching the hook to the body section 6 will not catch on the body section 5. As may be seen, the forward end 30 and upper surface of the section 6 are spaced from the walls of the recess 19.

Means 7 for pivotally connecting the sections 5 and 6 together so that they will move in water with a scissorlike motion when the bait is drawn through the water, includes, preferably, a screw eye 35 with its shank extending through a substantially vertically disposed perforation 36 in the forward end of the section 6 and screwed into the section 5, with the eye 37 of the screw eye 35 carrying a hook 8.

This screw eye 35 also carried one end of a connection or anchor 38 with its other end rigidly secured to the under side of the head portion of the section 5 as by the pin 39. The connection 38 may be a short strip of metal, extending longitudinally of the lure. It provides an additional connection, through the screw eye 35, of the two sections 5 and 6, and also braces the screw eye 35, as when the lure is being taken by or extracted from the fish.

In use, when the novel lure is drawn through the water, the sections 5 and 6 will oscillate with a scissorlike motion so as to attract the fish. In addition, as portions of the sections 5 and 6 move out of the same vertical planes, the color (as white) of the surface 21 of the exposed recess 19 will contrast with the colors (as green and brown) of the major outer surface 20 of the section 5 and lowermost surface of the section 6, and thus attract fish. Of course, the uppermost surface of the section 6 being of one color (as white), will contrast with that of the major outer surface of the section 5.

Thus, not only does the scissorlike movement of the sections 5 and 6 attract the fish, but they are also attracted by the changes in color brought about by this scissorlike movement, whereby the exposure of the contrasting colors is dependent upon the relative movement of the two sections 5 and 6.

Various changes may be made to the form of the invention herein shown and described without departing from the spirit of the invention or scope of the claims.

I claim:

1. In an artificial fish lure, a major body section simulating the head and upper body and tail portions of a fish, said section having a downwardly, transversely and rearwardly opening recess extending from rearwardly of said head, a minor body section, simulating the lower body and tail portions of a fish, disposed in said recess, and a vertically-disposed pivot connecting said sections.

2. In an artificial fish lure, a major body section simulating the head and upper body and tail portions of a fish, said section having a downwardly and transversely opening recess, a minor body section, simulating the lower body and tail portions of a fish, disposed in said recess, and a vertically-disposed pivot connecting said sections.

3. In an artificial fish lure, a major body section simulating the head and upper body and tail portions of a fish, said section having a downwardly and transversely opening recess, a minor body section, simulating the lower body and tail portions of a fish, disposed in said recess and extending rearwardly beyond the rear end of said major body section, and a vertically-disposed pivot connecting said sections.

4. In an artificial fish bait, a first body section having a head portion, a cut out in its lowermost portion, providing a recess open at its sides and including a substantially vertical wall spaced rearwardly of said head portion, the outer surfaces of the walls of said recess being colored and the outer surface of the rest of said body section being contrastingly colored, a second body section in said recess being colored upon the outer surface thereof facing the walls of said recess, the rest of the outer surfaces of said second body portion being colored differently from the surfaces of the walls of said recess, and means permitting oscillations of said second body section so as to expose the color upon the outer walls of said recess, comprising a pivot between said sections.

5. In a fish lure, a major body section including a head, and having a recess in the lowermost portion of said main body section, opening rearwardly and transversely of said main body section and spaced rearwardly of said head, a minor body section within said recess, a pivot pin joining said sections, and an anchoring means, comprising a rigid connecting member extending from said pivot pin below said minor body section to said head and rigidly secured thereto.

6. In a fish lure, a major body section including a head, and having a recess in the lowermost portion of said main body section, opening rearwardly and transversely of said main body section and spaced rearwardly of said head, a minor body section within said recess, a pivot pin joining said sections, and terminating in an eye at its lower end, and an anchoring means, comprising a rigid connecting member extending from the eye of said pivot pin to said head and rigidly secured thereto.

7. In an artificial bait for fish, a main body section having a step extending from a point rearwardly of its forward end, said step having a downwardly facing, substantially horizontal surface extending longitudinally of said section, a minor body section disposed within said step and having a substantially horizontal upper surface facing said first named surface and normally spaced therefrom, a vertically-disposed pivot pin joining said sections together at the forward end of each section, an action plate, and means to secure a fishline to said bait, both said plate and means being secured to the forward end of said main body section and disposed wholly below the plane of said first-named horizontal surface.

8. In an artificial fish lure an upper body section having an exterior contour simulating the upper portions of a fish, a lower body section having an exterior contour simulating the lower portions of a fish, and adapted normally to register with the upper section to simulate the complete body of a fish, the contiguous faces of the sections being planate and in facewise adjacency to one another, a vertical pivot connecting said sections together to permit relative lateral oscillation between the sections, a hook carried by one of said sections, and a line tie carried by one of said sections.

9. In an artificial fish bait, a first body section having a head portion, a cut out in its lowermost rearward portion, providing a downwardly-facing recess open at its sides and including a downwardly facing surface, said surface being colored the outer surface of the rest of said body section being contrastingly colored, a second body section disposed in said recess having an upwardly-facing surface facing and in close proximity to said downwardly facing surface, and an outer surface extending from said upwardly facing surface, said last named outer surface being colored differently from the color upon the downwardly-facing surface of said recess, and means permitting oscillations of said second body section exposing the color upon said downwardly-facing surface, comprising a pivot between said sections.

JOHN S. KUSLICH.

REFERENCES CITED

The following references are of record in the file of this patent:

UNITED STATES PATENTS

| Number | Name | Date |
|---|---|---|
| 1,477,864 | Bolton | Dec. 18, 1923 |
| 2,312,585 | Piro | Mar. 2, 1943 |
| 1,809,776 | Davenport | June 9, 1931 |
| 2,270,487 | Withey | Jan. 20, 1942 |
| 1,334,249 | Lane | Mar. 16, 1920 |
| 1,857,312 | Kuehn | May 10, 1932 |
| 2,229,239 | Davis | Jan. 21, 1941 |
| 1,873,289 | Clark | Aug. 23, 1932 |